US012763239B2

(12) United States Patent
Slade et al.

(10) Patent No.: US 12,763,239 B2
(45) Date of Patent: Oct. 13, 2026

(54) SUPERCONDUCTOR MAGNET SYSTEMS AND METHODS FOR GENERATING MAGNETIC FIELDS

(71) Applicant: Tokamak Energy Ltd, Oxfordshire (GB)

(72) Inventors: Robert Slade, Oxfordshire (GB); Jeroen van Nugteren, Oxfordshire (GB); Matthew Bristow, Oxfordshire (GB)

(73) Assignee: Tokamak Energy Ltd, Oxfordshire (GB)

( * ) Notice: Subject to any disclaimer, the term of this patent is extended or adjusted under 35 U.S.C. 154(b) by 147 days.

(21) Appl. No.: 18/862,316

(22) PCT Filed: May 3, 2023

(86) PCT No.: PCT/EP2023/061702
§ 371 (c)(1),
(2) Date: Nov. 1, 2024

(87) PCT Pub. No.: WO2023/213898
PCT Pub. Date: Nov. 9, 2023

(65) Prior Publication Data

US 2025/0342993 A1 Nov. 6, 2025

(30) Foreign Application Priority Data

May 3, 2022 (GB) .................................. 2206446.3

(51) Int. Cl.
*H01F 6/00* (2006.01)
*H01F 6/04* (2006.01)
(Continued)

(52) U.S. Cl.
CPC ............... *H01F 6/008* (2013.01); *H01F 6/04* (2013.01); *H01F 6/06* (2013.01); *H01F 27/402* (2013.01)

(58) Field of Classification Search
CPC . H01F 6/006; H01F 6/008; H01F 6/04; H01F 6/06; H01F 27/402
(Continued)

(56) References Cited

U.S. PATENT DOCUMENTS

2015/0213930 A1* 7/2015 Hahn .................... H01F 41/048 29/599
2019/0122796 A1* 4/2019 Noyes .................... H02H 7/001

FOREIGN PATENT DOCUMENTS

JP H1097900 4/1998
JP H1097900 A * 4/1998
(Continued)

OTHER PUBLICATIONS

Machine translation of Yamakaji et al. International Patent Document WO 2020245974 A1 Dec. 2020 (Year: 2020).*
(Continued)

*Primary Examiner* — Kevin J Comber
(74) *Attorney, Agent, or Firm* — Dority & Manning, P.A.

(57) ABSTRACT

A superconductor magnet system including a superconductor magnet including a plurality of field coils connected in series, each field coil having a plurality of turns including superconductor material. The system also includes a primary electric current source connected across the plurality of the field coils for supplying a DC electric current to the field coils to generate a magnetic field. The system further includes a secondary electric current source connected in parallel with the primary electric current source across a subset of the field coils for supplying an additional DC
(Continued)

electric current to the or each field coil in the subset to modify or correct the magnetic field.

19 Claims, 4 Drawing Sheets

(51) Int. Cl.
*H01F 6/06* (2006.01)
*H01F 27/40* (2006.01)
(58) Field of Classification Search
USPC .......................................................... 361/141
See application file for complete search history.

(56) References Cited

FOREIGN PATENT DOCUMENTS

| | | | |
|---|---|---|---|
| JP | 2017162896 | 9/2017 | |
| JP | 2017162896 A * | 9/2017 | |
| WO | WO2014207130 | 12/2014 | |
| WO | WO2019150123 | 8/2019 | |
| WO | WO2020079412 | 4/2020 | |
| WO | WO2020245974 | 12/2020 | |
| WO | WO-2020245974 A1 * | 12/2020 | .............. H01F 6/02 |
| WO | WO2021236194 | 11/2021 | |

OTHER PUBLICATIONS

Machine translation of Mikami et al. Japanese Patent Document JP 2017-162896 A Sep. 2017 (Year: 2017).*

Machine translation of Kamiya et al. Japanese Patent Document JP H10-97900 A Apr. 1998 (Year: 1998).*

PCT International Search Report and Written Opinion for corresponding PCT Application No. PCT/EP2023/061702, mailed Jul. 24, 2023, 23 pages.

Ravaioli, "CLIQ A new quench protection technology for superconducting magnets", Massachusetts Institute of Technology , PhD Dissertation, 2015, 225 pages.

International Preliminary Report on Patentability for corresponding Application No. PCT/EP2023/061702, dated Oct. 29, 2024, 15 pages.

* cited by examiner

SUPERCONDUCTOR MAGNET SYSTEMS AND METHODS FOR GENERATING MAGNETIC FIELDS

CROSS-REFERENCE TO RELATED APPLICATIONS

This application is the U.S. National Stage entry of International Application No. PCT/EP2023/061702, filed on May 3, 2023, which, in turn, claims priority to GB Patent Application No. 2206446.3, filed on May 3, 2022, all of which is hereby incorporated herein by reference in its entirety for all purposes.

TECHNICAL FIELD

The present invention relates to systems comprising superconductor magnets, particularly high temperature superconductor (HTS) magnets, and methods for generating magnetic fields. In particular, it relates to modifying or correcting magnetic fields generated using superconductor magnets.

BACKGROUND

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a peak critical temperature (the temperature above which the material cannot be superconducting, even in zero magnetic field) below 30 K. The behaviour of HTS materials is not described by BCS theory, and many have critical temperatures well above 30 K. The most commonly used HTS materials are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diboride ($MgB_2$).

ReBCO superconductors are typically manufactured as tapes approximately 100 micrometres thick and with a width of between 2 mm and 12 mm. The structure of a typical tape 100 is illustrated in FIG. 1 and includes a substrate 101 (typically an electropolished nickel-molybdenum alloy, e.g Hastelloy™ approximately 50 micrometres thick), on which is deposited a series of buffer layers known as the buffer stack 102, of approximate thickness 0.2 micrometres. An epitaxial ReBCO-HTS layer 103 overlays the buffer stack, and is typically 1 micrometre thick. A 1-2 micrometre silver layer 104 and a copper stabilizer layer 105 are deposited on and often completely encapsulate the tape. The silver layer 104 and copper stabilizer layer 105 extend continuously around the perimeter of the tape 100 (not illustrated in FIG. 1 for clarity) and may therefore also be referred to as "cladding". The silver layer 104 makes a low resistivity electrical interface to, and an hermetic protective seal around, the ReBCO layer 103, whilst the copper layer 105 enables external connections to be made to the tape (e.g. by soldering) from either face and provides a parallel conductive path for electrical stabilization. "Exfoliated" HTS tape can also be manufactured, which lacks a substrate and buffer stack.

HTS tapes and other superconducting materials may be characterised by a critical surface of a maximum current, temperature and magnetic field at which the superconductor transitions from a superconducting state to a normal state. For example, the critical current, $I_c$, is the current at which the superconductor becomes normal at a given temperature and magnetic field, and the critical temperature, $T_c$, is the temperature at which the superconductor becomes normal for a given magnetic field and current. Critical temperature is often formally defined for zero magnetic field, but the term is used more generally herein for convenience. The critical surface of many HTS tapes can also be highly dependent on both the magnitude and direction of a magnetic field.

An HTS cable comprises one or more HTS tapes, which are connected along their length via conductive material, normally copper. Under this definition, a single HTS tape is an HTS cable. The HTS tapes may be stacked (i.e. arranged such that the HTS layers are parallel), or they may have some other arrangement of tapes, which may vary along the length of the cable.

A superconducting magnet is formed by arranging HTS cables into coils comprising one or more turns. A turn (or winding) of a coil is a section of HTS cable which encloses the inside of the coil (i.e. which can be modelled as a complete loop). Broadly speaking, there are two types of construction for magnetic coils—by winding, or by assembling several sections. Wound coils, as shown in FIG. 2, are manufactured by wrapping an HTS cable 201 around a former 202 in a continuous spiral. The former is shaped to provide the required inner perimeter of the coil, and may be a structural part of the final wound coil, or may be removed after winding. Sectional coils, as shown schematically in FIG. 3, are composed of several sections 301, each of which may contain several cables or preformed busbars 311 and will form an arc (i.e., a continuous section that is less than a whole turn) of the overall coil. The sections are connected by joints 302 to form the complete coil. Coils or coil sections will often be consolidated by encapsulating or potting them, and the encapsulating material may fill spaces between the turns.

Suitable encapsulation materials include both insulating materials such as epoxies and conductive materials such as solders.

FIG. 4 shows a cross section of a specific type of wound coil known as a "pancake coil", where HTS cables 401 are wound in a planar spiral to form a flat coil. Pancake coils may be made with an inner perimeter which is any 2-dimensional shape. Often, pancake coils are provided as a "double pancake coil", as shown in the cross section of FIG. 5. These comprise two pancake coils 501, 502 wound in opposite sense with insulation 503 between them. The inner terminals are connected 504. This means that a voltage only needs to be supplied to the outer terminals 521, 522, which are generally more accessible, to drive current through the turns of the coil and generate a magnetic field. Many other coil configurations are possible, including helical solenoids.

One use of HTS field coils is in tokamak plasma chambers, including spherical tokamaks, where strong magnetic fields are required to confine and control plasma. Another potential use of HTS field coils is in proton beam therapy (PBT) and proton boron capture therapy (PBCT) devices in which beams of protons are used in the treatment of cancers. PBT and PBCT devices require very high magnetic fields to both accelerate and steer the proton beams.

HTS coils come in three broad classes:

- Insulated, having electrically insulating material between and separating the turns. In this arrangement, current can flow only around the turns of the coil (i.e., in a spiral path along the HTS cables).

- Non-insulated, where the turns are connected with a low resistance, e.g. by a conductive metal. This can be achieved, for example, by forming the coil such that the copper stabilizer layer (or other metal cladding) connects the turns and/or the coil is potted with a conductive solder.
- Partially insulated, where turns are connected with a resistance intermediate between a conductor and an insulator. This may be achieved by separating the turns with a material having a high resistance compared to copper (e.g., a co-wound stainless steel tape or any layer with a desired resistance), and/or by providing intermittent insulation between the turns, and/or by providing resistive material (which may comprise components such as resistors) along the side of a coil and connecting at least some of the turns. The resistance between turns in a partially insulated coil may be controlled between 100 and $10^{15}$ times that of copper to achieve a desired ratio, L/R, between the inductance, L, around the coil and the resistance, R, across it. Different forms of partial insulation are described in WO2019150123 and WO2020079412 as just some examples.

Non-insulated coils can be considered as the low-resistance case of partially insulated coils. In general, in both partially insulated and non-insulated pancake coils, the turns are connected by a normally (i.e., non-superconducting) conductive material or, equivalently, a resistive (but not insulating) material such that electric current can be shared between the turns via the conductive material. For example, in pancake coils current can flow radially as well as around the spiral path. In a solenoid, an additional longitudinal current path is provided.

A non-insulated or partially-insulated HTS coil can be modelled as having three current paths—two spiral paths, which follow the HTS cables around the turns (one in the HTS and one in the metal stabilizer), and a turn-to-turn path across the magnet, between coil terminals. In a pancake coil, for example, the turn-to-turn path will be a radial path through the metal stabilizer and any other resistive material connecting the turns. While this can be modelled as a single path, it in fact represents the sum of all resistive paths across the magnet. Only current flowing in the spiral paths generates a significant magnetic field. The HTS spiral path can be modelled as an inductor having a large inductance and zero or negligible resistance when the tape is all superconducting. The stabilizer spiral path is in parallel with the HTS spiral path and has the same inductance (in a simple model), but significant resistance. For this reason, negligible current flows in it unless parts of the HTS spiral path start to quench. The turn-to-turn path across the magnet can be modelled as having a negligible inductance and a much greater resistance than the HTS spiral path while the HTS material is superconducting. Negligible current flows in this path unless parts of the HTS spiral path start to quench or the current in the HTS spiral path is changed (due to the large inductance of HTS spiral path opposing a change in current). If the HTS spiral path starts to quench, excess current above the critical current $I_c$ of the HTS spiral path shares between the spiral stabilizer path and the turn-to-turn path according to their relative resistances and L/R time constants.

HTS field coils are generally designed to operate with all the HTS tapes in all turns running at less than their local critical current, $I_c$, which varies around the coil due to variations in the magnetic field and coil temperature. However, various fault conditions can cause HTS tape currents to exceed the critical current:

- Cooling failure, increasing the temperature (locally or globally) and thereby reducing $I_c$.
- Transient increase in transport current, $I_0$, e.g. a power supply over-current fault.
- Damage to the HTS material (for example, due to stress cracking, fatigue from thermal cycling or energization cycling of the magnet).
- Localized energy deposition that is sufficient to cause a thermal runaway.

If the current in any tape exceeds (or nears) the local critical current, some of the current will be driven into the metal layers of the tape (principally the copper stabilizer layer), into any other normally conductive (i.e., not superconducting) material separating the turns in a non-insulated or partially insulated coil and into any "spare" $I_c$ capacity of nearby HTS material. Current flowing through normally conductive material generates heat and reduces the local critical current $I_c$ further, potentially leading to thermal runaway.

The region of the HTS tape initially affected by a fault condition is known as a "hotspot". Early detection of hotspots is important so that damage to the HTS magnet can be avoided by "quenching" the magnet and dissipating its energy. Various approaches to detecting hotspots are known, e.g. using temperature sensors, strain sensors or voltage taps distributed around the magnet. Large HTS magnets are able to store huge amounts of magnetic energy, which needs to be dissipated safely and rapidly in the event of a quench.

JPH1097900 describes a superconducting wiggler comprising a pair of centre coils. A first exciting current is made to flow through an inner part of each centre coil, where the magnetic field is large. A second exciting current, stronger than the first exciting current, is made to flow through an outer part of each centre coil, where the magnetic field is small. To apply a different current to each portion of the centre coil, the first excitation current flowing through the inner part is added to the second excitation current flowing through the outer part.

SUMMARY OF THE INVENTION

According to a first aspect of the present invention there is provided a superconductor magnet system comprising a superconductor magnet comprising a plurality of field coils connected in series, each field coil having a plurality of turns comprising superconductor material. The system also comprises a primary electric current source connected across the plurality of the field coils for supplying a DC electric current to the field coils to generate a magnetic field. The system further comprises a secondary electric current source connected in parallel with the primary electric current source across a subset of the field coils for supplying an additional DC electric current to the or each field coil in the subset to modify or correct the magnetic field.

The secondary electric current source, may for example, be configured to supply the additional DC electric current to the field coils in the subset to make the magnetic field more homogeneous in a particular region of space. The secondary electric current source may be adjustable such that the additional DC electric current supplied to the field coils in the subset can be varied to compensate for changes in screening currents within the superconductor material.

The field coils being "connected in series" means that the coils are connected one to another such that there is a path for electric current to flow successively (i.e. one after another) through the coils. Each turn of the field coil refers to a complete revolution of the tape, wire, cable etc. comprising the superconductor (e.g. HTS) material around an axis (although in some cases the field coils may be asymmetric such that different turns do not encircle a common axis).

Each field coil may have an alternative current path across it, the alternative current path comprising resistive material and having a low inductance compared to the respective field coil such that a changing current across the field coil preferentially flows through the alternative current path. The alternative current path is in thermal contact with the field coil such that heating of the resistive material caused by current flowing through the alternative current path causes heating of the superconductor material of the respective field coil. For example, successive turns in the coil, or at least some of the turns, may be connected in series by electrically conductive material or by an electrically conductive layer separating the turns. Electric current may therefore pass from one turn to the next, or be shared between turns, by flowing around the turn within the superconductor material (in a "spiral" path") and/or by flowing through the electrically conductive material. The electrically conductive material provides the alternative current path which may be referred to as a turn-to-turn path or as a radial path in a planar coil.

The subset of the field coils may be a contiguous subset of the field coils, i.e. a subset in which each field coil in the subset is connected to another field coil in series without any of the field coils not in the subset intervening.

A DC electric current may, in the context of a current flowing through the one or more field coils connected in series, be defined as an electric current that persists for many (e.g. more than 5, 10, 100 etc.) multiples of the time constant of the one or more field coils connected in series. The time constant may be defined as the ratio (L/R) of the inductance (L) of the one or more field coils to the combined turn-to-turn or radial resistance (R) of the one or more field coils.

The additional DC electric current supplied to the subset of field coils allows a contribution of the magnetic field generated by the field coils in the subset to the overall magnetic field generated by the superconductor magnet to be controlled. For example, the additional DC electric current supplied by the secondary electric current source may be less than (e.g. 1%, 10% or 20% of) the DC electric current supplied by the primary electric current source, allowing the overall magnetic field to be corrected or "fine-tuned" by controlling the total electric current flowing in the superconductor material of each of the field coils in the subset. By correcting the magnetic field, the magnetic field generated by the magnet in practice may more closely match a predetermined magnetic field, such as may have been intended by a designer of the magnet. The secondary electric current source may be configured to cause the additional DC electric current to flow in the same direction as, or in opposition to, the DC electric current supplied by the primary electric current source depending on whether the contribution of the magnetic field generated by the field coils in the subset to the overall magnetic field generated by the magnet is to be increased or decreased. In some cases, the contribution of the magnetic field generated by the field coils in the subset may be increased or decreased to achieve a more homogenous magnetic field in a target region.

The additional DC electric current supplied by the secondary electric current source may, in some cases, avoid or reduce the need for shim coils to be used to correct or adjust the magnetic field generated by the superconductor magnet.

The system may further comprise a control system for adjusting the additional DC electric current supplied by the secondary electric current source to generate a magnetic field having one or more predetermined target parameters. The one or more predetermined target parameters may comprise one or more of: a magnitude of the magnetic field in a region of space; a magnitude of a component of the magnetic field along a direction in a region of space; a direction of the magnetic field in a region of space; and a gradient of the magnetic field in a region of space. The system may further comprise a magnetic field sensor (e.g. a Hall probe) for measuring one or more parameters of the magnetic field generated by the superconductor magnet in a region of space within or adjacent to the magnet. The control system may be configured to adjust the additional DC electric current supplied by the secondary electric current source to reduce absolute differences between one or more measured parameters of the magnetic field and the corresponding one of the predetermined target parameters. For example, the control system may comprise a feedback controller, such as a proportional-integral-derivative (PID) controller. In some cases, the control system may also be configured to adjust the additional electric current to produce a time-varying magnetic field (with or without the use of feedback control).

The system may be configured such that the superconductor material in the field coils in the subset has a higher critical current than the superconductor material in the field coils not in the subset when the DC electric current from the primary electric current source is supplied to the field coils. The primary and secondary electric current sources may be configured such that the additional DC electric current supplied by the secondary electric current source is less than the DC electric current supplied by the primary electric current source. In this case, the additional DC electric current supplied to the field coils in the subset may allow an increased magnetic field to be generated by the magnet without the transport current exceeding the critical current of the superconductor material in any of the coils. In addition, the maximum magnitude of screening currents in the superconductor material that can be carried during steady state operation of the magnet, which depends on the difference between the magnitudes of the transport current (i.e. the DC electric current) and the critical current, may therefore be decreased (i.e. lower screening currents may be produced at higher current "saturation"). Lower screening currents may mean that the magnetic field generated by the HTS magnet more accurately matches its design specifications and/or is more stable. In some applications, the increased stability arising from lower screening currents may mean that the need for additional shim coils is reduced or eliminated. Increased stability may be particularly advantageous for applications such as nuclear magnetic resonance (NMR) and/or magnetic resonance imaging (MRI).

The maximum transport current to critical current ratio of the superconductor material may occur at the radially innermost turns of the field coil, for example. A maximum transport current to critical current ratio for each of the field coils in the subset may be less than or equal to a maximum transport current to critical current ratio for the field coils not in the subset. Alternatively, a maximum transport current to critical current ratio for each of the field coils in the subset may be greater than a maximum transport current to critical current ratio for the field coils not in the subset.

The field coils may be planar (i.e., pancake) coils. Each pancake coil has a respective axis about which the turns are wound, the turns being nested radially one inside the other with respect to the axis. The field coils may be arranged face-to-face in a stack (e.g. such that the turns of each pancake coil enclose a common axis and the field coils are arranged along that axis). The subset of field coils may comprise one or more individual adjacent field coils in the stack. The subset of the field coils may exclude one or both of the field coils at either end of the stack. In such arrangements, the critical current of the superconductor material in the field coils at either end of the stack may be lower than the critical current of the superconductor material in the field coils nearer the midpoint of the stack. For example, where the superconductor material is HTS material, the magnetic field angle at either end of the magnet may be less well aligned with the ab-axis of the HTS material in the coils, meaning that the HTS material in the coils towards either end of the stack have lower critical currents than the HTS material in the coils located closer to the middle of the stack. Thus, the additional DC electric current may be provided to the coils located closer to the middle of the stack in order to increase the total DC electric current flowing through the HTS material. In some implementations, the DC electric current supplied by the primary electric current source and the additional DC electric current supplied by the secondary electric current source may be adjusted (e.g. iteratively) to obtain a desired (e.g. increased or maximum) magnetic field.

In some implementations, the turns in each of the field coils are connected by electrically conductive material and/or separated by an electrically conductive layer such that electric current can be shared between the turns in the field coil. For example, where the field coils are pancake coils, an electrically conductive layer allows electric current to be shared radially between the turns (in addition to the spiral current path provided by the turns, in which the electric current flows almost exclusively in the superconductor material). The conductive material is in thermal contact with the superconductor material. Particularly good thermal contact can be achieved where the electrically conductive material comprises an electrically conductive layer separating the turns. Another arrangement is to provide the electrically conductive material alongside the coil. The secondary electric current source may be configurable to cause an additional AC electric current to flow between the turns of the field coils in the subset via the electrically conductive material of the field coil, whereby resistive heating of the electrically conductive material heats the superconductor material in the turns of the field coils in the subset. The resistive heating of the electrically conductive material lowers the critical current of the superconductor material (e.g. HTS material) in the turns of the field coils in the subset, preferably such that a maximum transport current to critical current ratio for each of the field coils in the subset is greater than or equal to a maximum transport current to critical current ratio for the field coils not in the subset. In some cases, the transport current to critical current ratio of the superconductor material in each of the field coils in the superconductor magnet may differ by less than 20%, preferably less than 10% or more preferably by less than 5%. Thus, the combination of the additional DC and AC electric current may act synergistically to reduce the magnitude of screening currents in the field coils of the subset.

In implementations where the field coils are insulated coils, the additional AC current may also be provided to the subset of coils to disrupt or "scramble" screening currents in these field coils and/or the field coils not in the subset. This process may be referred to as degaussing.

The system may further comprise a cryostat housing the magnet, the cryostat being configured to maintain the superconductor material at temperatures below a critical temperature of the superconductor material during operation of the magnet. The primary electric current source and the secondary electric current source may be housed within the cryostat. In this case, the cryostat comprises feedthroughs (i.e. electrical connectors extending from a higher temperature outside the cryostat to a lower temperature inside the cryostat) for supplying electrical power to the primary electric current source and the secondary electric current source. The primary electric current source and the secondary electric current source may be configured to receive electrical power from different feedthroughs. For example, the feedthroughs for supplying electrical power to the primary electric current source may be electrically isolated from the feedthroughs for supplying power to the secondary electric current source. In some cases, the primary electric current source and the secondary electric current source may be configured to receive electrical power from the same feedthroughs simultaneously. The use of different feedthroughs to supply power to the primary and secondary electric current sources may mean that less current is required to pass through each feedthrough compared to when the same feedthroughs are used to supply power to the primary and secondary electric current sources simultaneously. This may allow feedthroughs of lower cross sectional area to be used. Alternatively, the primary electric current source and/or the secondary electric current source may be provided outside of the cryostat, in which case feedthroughs may be provided for supplying electric current to the field coils from the primary electric current source and/or the secondary electric current source.

The system may also comprise a further secondary electric current source connected across a further subset of the field coils for supplying an additional DC and/or AC electric current to the field coils in the further subset. The further secondary electric current source may therefore provide further "fine tuning" of the magnetic field and/or compensate for differences in critical current in the superconductor material in the field coils in each subset. The secondary electric current source and the further secondary electric current source may be connected in parallel across the further subset of the field coils. In this case, the further subset of the field coils is a subset of the subset of the field coils. Thus, the field coils in the further subset may receive additional electric current from both the secondary electric current sources.

According to a second aspect of the present invention, there is provided a method of generating a magnetic field using a superconductor magnet comprising a plurality of field coils connected in series. Each field coil has a plurality of turns comprising superconductor material. The method comprises using a primary electric current source connected across the plurality of the field coils to supply a DC electric current to the field coils to generate a magnetic field. The method further comprises using a secondary electric current source connected in parallel with the primary electric current source across a subset of the field coils to supply an additional DC electric current to the field coils in the subset to modify or correct the magnetic field.

The method may further comprise adjusting the additional DC electric current supplied by the secondary electric current source to generate a magnetic field having one or more predetermined target parameters (e.g. having a desired magnetic field quality). The one or more predetermined target parameters may comprise one or more of a magnitude of the magnetic field in a region of space, a magnitude of a component of the magnetic field along a direction in a region of space, a direction of the magnetic field in a region of space, a gradient of the magnetic field in a region of space, a spatial homogeneity of the magnetic field, and a stability of the magnetic field over time. The angular dependence of the magnetic field with respect to an axis may be described, for example, by a weighted sum of spherical harmonic functions. Weightings of the spherical harmonic functions may be varied by adjusting the additional DC electric current supplied by the secondary electric current source.

The method may also include obtaining measurements of one or more parameters of the magnetic field generated by the superconductor magnet, and wherein the adjusting the additional DC electric current supplied by the secondary electric current source comprises reducing absolute differences between one or more measured parameters of the magnetic field and a corresponding one of the predetermined target parameters.

The additional DC electric current supplied by the secondary electric current source may be less than the DC electric current supplied by the primary electric current source. The additional DC electric current supplied by the secondary electric current source may be adjusted such that a transport current to critical current ratio of the superconductor material in each of the field coils differs by less than 20%, preferably less than 10% or more preferably by less than 5%. A transport current to critical current ratio for each of the field coils in the subset may be greater than or equal to a transport current to critical current ratio for the field coils not in the subset.

The superconductor magnet may have a time constant (L/R) defined by a ratio of the inductance of the magnet (L) to a turn-to-turn or radial resistance of the magnet (R) and the DC electric current and the additional DC electric current are supplied for a duration greater than 5, 10, 50, 100 or 1000 time constants (for example). Radial resistance refers to the resistance between respective ends of the radially innermost and the radially outermost turns of the magnet when the superconductor material is in a superconducting state.

The turns in each of the field coils may be connected by electrically conductive material and/or separated by an electrically conductive layer such that electric current can be shared between the turns in the field coil. The method may further comprise using the secondary electric current source to supply an additional AC electric current that flows between the turns of the field coils in the subset via the electrically conductive material of the field coil, whereby resistive heating of the electrically conductive material heats the superconductor material in the turns of the field coils in the subset.

According to a third aspect of the present invention, there is provided a superconductor magnet system including a superconductor magnet comprising a plurality of field coils connected in series. Each field coil having a plurality of turns comprising superconductor material. The superconductor magnet also comprises a primary electric current source connected across the plurality of the field coils for supplying a DC electric current to the field coils to generate a magnetic field. The superconductor magnet further comprises a secondary electric current source connected in parallel with the primary electric current source across a subset of the field coils for supplying an additional AC electric current to the field coils in the subset.

The turns in each of the field coils may be connected by electrically conductive material and/or separated by an electrically conductive layer such that electric current can be shared between the turns in the field coil. The secondary electric current source is configurable to cause the additional AC electric current to flow via the electrically conductive material of the field coil (e.g. between the turns of the field coils in the subset), whereby resistive heating of the electrically conductive material heats the superconductor material in the turns of the field coils in the subset. As discussed in connection with the above aspects, heating the superconductor material may lower its critical current such that the ratio of transport current to critical current in the superconductor material is increased, thereby reducing the magnitude of screening currents in the field coils of the subset. The amount of heating may be controlled by adjusting an amplitude, frequency and/or waveform of the AC electric current, for example.

Alternatively, each of the field coils may be an insulated coil (such that the turns are separated by an electrically insulating material). In this arrangement, the secondary electric current source may be configurable to cause the additional AC electric current to disrupt screening currents in the superconductor material to generate a more stable magnetic field.

According to a fourth aspect of the present invention there is provided a method of generating a magnetic field using a superconductor magnet comprising a plurality of field coils connected in series, each field coil having a plurality of turns comprising superconductor material. The method comprises using a primary electric current source connected across the plurality of the field coils to supply a DC electric current to the field coils to generate a magnetic field. The method further comprises using a secondary electric current source connected in parallel with the primary electric current source across a subset of the field coils to supply an additional AC electric current to the field coils in the subset. As in the third aspect, resistive heating of an electrically conductive material connecting the turns may lower a critical current of the superconductor material in the turns of the field coils in the subset, or an additional AC electric current applied to an insulated coil may be used to disrupt screening currents and generate a more stable magnetic field.

A maximum transport current to critical current ratio of the superconductor material in each of the field coils of the superconductor magnet may differ by less than 20%, preferably less than 10% or more preferably by less than 5%. The maximum transport current to critical current ratio of the superconductor material may occur at the radially innermost turns of the field coil, for example. A maximum transport current to critical current ratio for each of the field coils in the subset may be greater than or equal to a maximum transport current to critical current ratio for the field coils not in the subset. Alternatively, a maximum transport current to critical current ratio for each of the field coils in the subset may be less than a maximum transport current to critical current ratio for the field coils not in the subset.

The superconductor magnet may have a time constant defined by a ratio of the inductance of the magnet to a radial resistance of the magnet. The DC electric current and the additional AC electric current may be supplied for a duration greater than 5 time constants, preferably greater than 10 time constants and more preferably greater than 100 time constants.

The method may further comprise receiving a measurement of a parameter associated with the magnetic field generated by the superconductor magnet in a region of space and adjusting the additional AC electric current supplied by the secondary electric current source to reduce a difference between the measurement and a predefined target value for the parameter. The additional AC electric current may, for example, reduce or eliminate screening currents and increase the field quality/homogeneity in a particular region of space.

In each of the above aspects, the superconductor material is preferably an HTS material, e.g. ReBCO, although LTS material may alternatively be used in some implementations. The turns of the field coils may, for example, comprise HTS tape as described above with reference to FIG. 1.

DETAILED DESCRIPTION

The present disclosure provides systems and methods for generating a desired magnetic field from a superconductor dipole magnet comprising a plurality of field coils connected in series. Several such dipole magnets may be arranged to form a quadrupole magnet, a sextupole magnet or other magnet configurations.

In the below description, the coils are assumed to be planar, spirally wound coils (i.e., pancake coils) with partial insulation provided by a conductive layer separating the turns. This is purely for ease of illustration. It will be recognised that the techniques described below can be applied to many coil constructions, including those discussed in the background introduction, and that the below is just one, non-limiting example.

Figure 6:
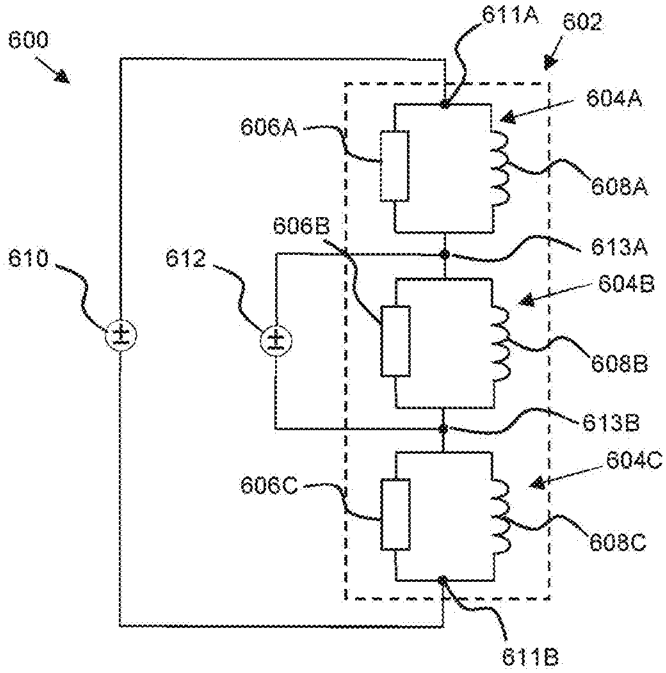
FIG. 6 is a circuit diagram of a superconductor magnet system.

FIG. 6 shows a circuit diagram of a superconductor magnet system 600 comprising a superconductor magnet 602 that has first, second and third field coils 604A-C connected in series with one another. Each of the field coils 604A-C is represented in the figure by a resistor 606A-C connected in parallel with an inductor 608A-C. In the present example, each of the field coils 604A-C are partially insulated, with a conductive layer interposed between the turns. The conductive layer allows electric current to flow radially between the turns, thereby bypassing the spiral path provided by the HTS material in the turns around which the current circulates in order to generate a magnetic field. However, in some cases, fully insulated field coils (in which radial turn-to-turn conduction is prevented by an insulating layer between the turns) may be used instead or in addition.

Figure 1:
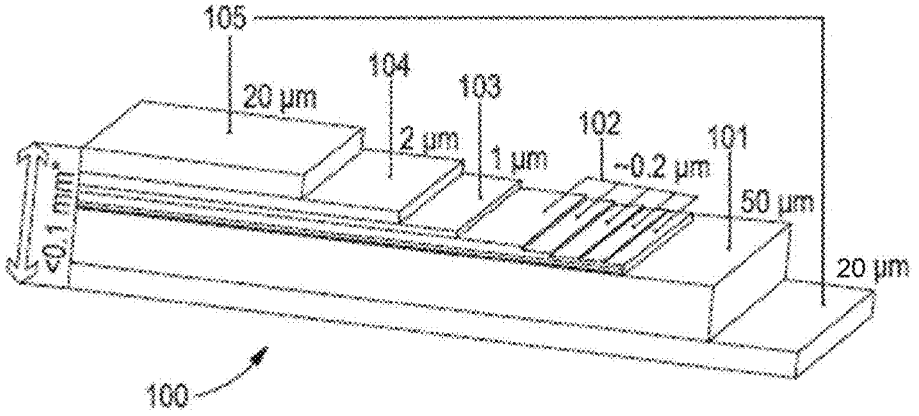
FIG. 1 is a schematic representation of an HTS tape.
Figure 2:
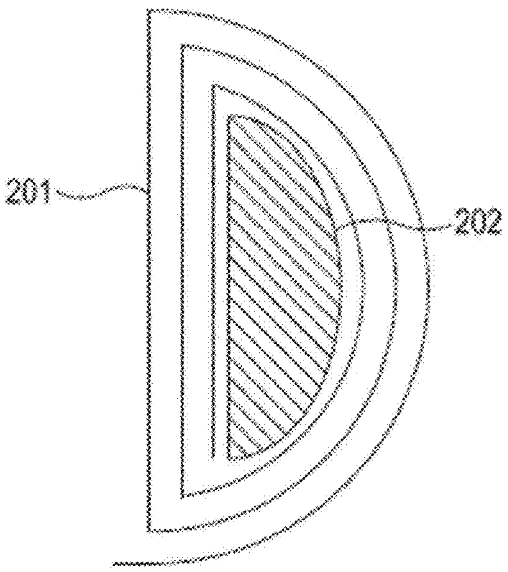
FIG. 2 is a schematic representation of a wound HTS coil.
Figure 3:
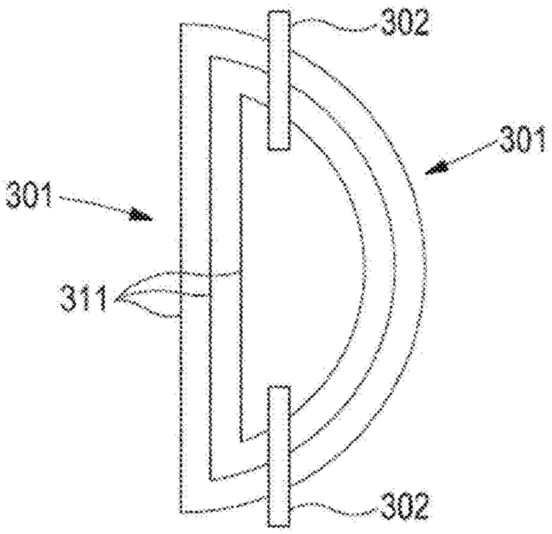
FIG. 3 is a schematic representation of a sectional HTS coil.
Figure 4:
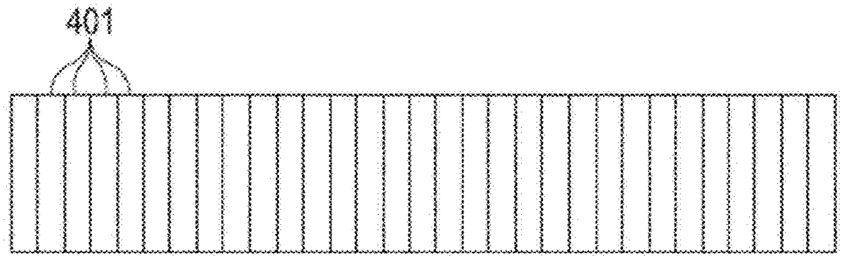
FIG. 4 is a cross section of a pancake coil.
Figure 5:
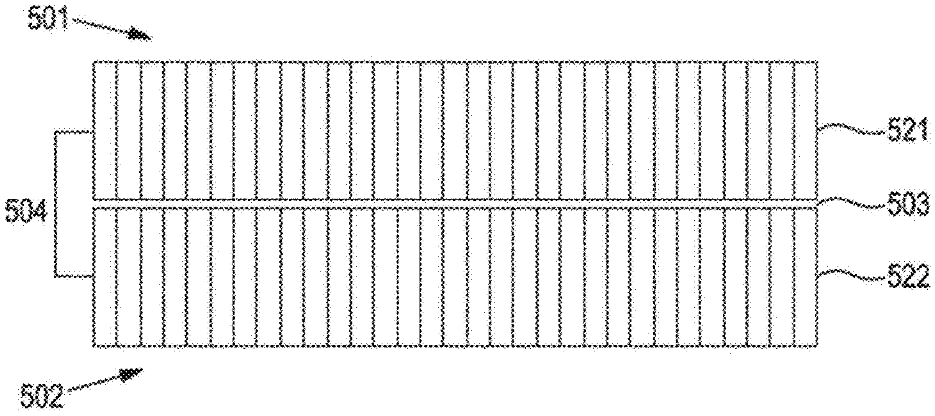
FIG. 5 is a cross section of a double pancake coil.

In the present example, each field coil 604A-C is a pancake coil comprising turns of HTS tape, e.g. as described above with reference to FIG. 1, although tape comprising LTS material may alternatively be used in some implementations. The field coils 604A-C are arranged face-to-face, one atop the other to form a stack. Current is supplied to the superconductor magnet 602 from a primary electric current source 610 connected across a pair of terminals 611A-B provided at either end of the superconductor magnet 602. In use, the primary electric current source 610 supplies a DC electric current to the superconductor magnet 602 such that the current passes through a first of the terminals 611A, circulates around successive turns of each of the field coils 604A-C in the stack, and then leaves the superconductor magnet 602 through the second of the terminals 611B.

A secondary electric current source 612 is connected across the second (middle) field coil 604B of the superconductor magnet 602 using a first terminal 613A located between the first and second field coils 604A, B and a second terminal 613B located between the second and third field coils 604B,C. In the present example, the secondary electric current source 612 is configured to supply an additional DC electric current to the second field coil 604B. In use, the additional DC electric current flows around the turns of the second field coil 604B to increase the transport current flowing within the HTS material, over and above the DC electric current supplied by the primary electric current source 610. The magnetic field produced by the superconductor magnet 602 has greater curvature towards the ends of the stack of pancake coils 604A-C as compared to the middle of the stack. This greater curvature means that the magnetic field is generally less well aligned with a crystal axis (e.g. ab-axis) of the HTS material in the first and third field coils 604A-C located at either end of stack as compared to the second field coil 604B located in the middle of the stack. The HTS material in the second field coil 604B therefore generally has a higher critical current than the HTS material in the first and third field coils 604A,C and can therefore accommodate greater transport currents without loss of superconductivity. The secondary electric current source 612 may have the same polarity of as the primary electric current source 610 so that a greater electric current flows within the HTS material in the turns of the second field coil 604B than the electric current that flows in the HTS material in the turns of the first and third field coils 604A, C. One or both of the electric current sources 610, 612 may be tuneable such the absolute and/or relative amounts of current supplied by the primary and secondary electric current sources 610, 612 can be varied. For example, the currents may be adjusted so that the ratio of transport current to critical current in the HTS material in each of the field coils 604A-C is approximately constant, thereby allowing efficient use to be made of the superconducting "capacity" of the field coils and/or to reduce the magnitude of screening currents in the HTS material. Alternatively, the absolute and/or relative amounts of transport current flowing in the field coils 604A-C may be tuned to control the contributions to the magnetic field provided by each of the field coils 604A-C, thereby altering the magnitude and/or shape of the magnetic field generated by the superconductor magnet 602 as a whole. Such tuning may eliminate the need for separate "shim" coils to achieve a desired (e.g. more uniform) magnetic field.

Figure 7:
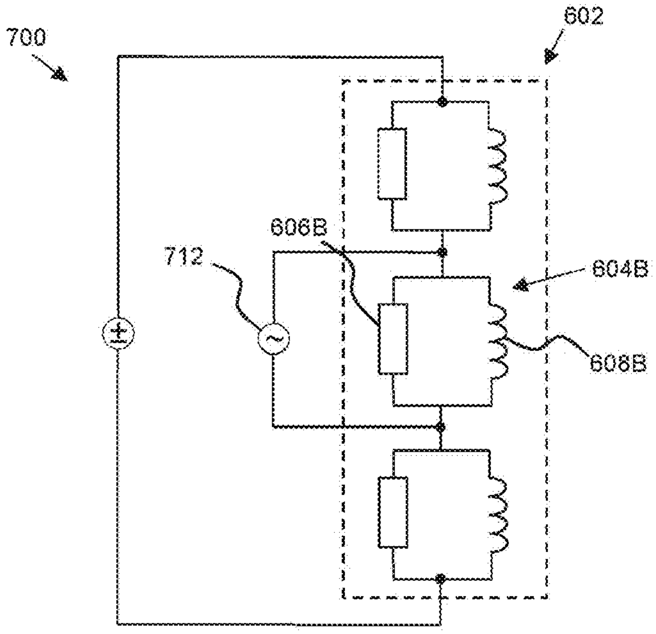
FIG. 7 is a circuit diagram of another superconductor magnet system.

FIG. 7 shows a circuit diagram of another superconductor magnet system 700 that is identical to the superconductor magnet system 600 of FIG. 6, except that the secondary electric current source 712 is configured to supply an AC electric current to the second field coil 604B. In a partially insulated magnet of the present example, the AC electric current flows preferentially between the turns of HTS material via the electrically conductive layer of the partially insulated coil 604B, which is represented in FIGS. 6 and 7 by the resistor 606B. By contrast, very little AC electric current flows around the superconducting "spiral" path in the field coil 604B, as represented by the inductor 608B, because the field coil 604B has a long time constant relative to the frequency of the AC electric current. It will be appreciated that, in other implementations in which insulated coils are used (in which the turn-to-turn resistance is very high), AC electric current would flow within the spiral path of the coil. Resistive heating of the electrically conductive layer (i.e. the resistor 606B) by the AC current raises the temperature of the layer and the HTS material in the turns on either side of the layer. As the critical current of the HTS material decreases as its temperature increases, the ratio of transport current to critical current in the HTS material increases after the AC current is applied, meaning that screening currents in the HTS material are suppressed. The magnetic field produced by the superconductor magnet 602 may therefore more closely match the magnetic field intended by the designer of the magnet system, be more stable and/or reduce "drift" in the magnetic field. One or more parameters of the AC current, such as its amplitude, frequency and/or waveform, may be varied in order to control the temperature of the HTS material and hence the ratio of transport current to critical current in the HTS material.

In some implementations, the secondary electric current sources 612, 712 may be configured to provide both a DC and AC electric current to the second field coil 604B, either simultaneously or separately. For example, the secondary electric current sources 612, 712 may provide a DC current to the second field coil 604B to adjust (e.g. maximise) the transport current in the HTS material in the turns of the second field coil 604B, whilst simultaneously providing an AC current that decreases the critical current of the HTS material. Therefore, the local ratio of the transport current to critical current ratio can be increased (i.e., brought closer to one without quenching the magnet or any of the field coils) in different coils of the magnet. In certain applications, the primary electric current source 610 may also be configured to supply an AC electric current in addition to the DC electric current.

In general, the majority of the electric current supplied to the coils is supplied by the primary electric current source 610, with the secondary electric current source(s) 612, 712 providing a smaller amount of current in order to allow the magnetic field generated by the superconductor magnet 602 to be corrected or modified by a relatively small amount.

The superconductor magnet system 600, 700 may be housed within a cryostat (not shown) which cools the superconductor magnet 602 so that the superconductor material becomes and remains superconducting. The primary and secondary electric current sources 610, 612, 712 may be supplied with electrical power through feedthroughs passing from the relatively higher temperature exterior of the cryostat to the lower temperature interior of the cryostat. Separate pairs of feedthroughs may be provided for both of the electric current sources 610, 612, 712, or alternatively a single pair of feedthroughs may be used to supply electrical power to both the primary and secondary electric current sources 610, 612, 712.

It will be appreciated that, in general, the superconductor magnet 602 may have any number of field coils 604A-C greater than one, such that that the secondary electric current source 612, 712 can be connected across a subset of the field coils (the subset containing at least one, but not all, of the field coils, i.e. a strict subset). For example, the superconductor magnet 602 may have only two field coils 604A-C or may have 3, 4, 5 or 10 or more field coils 604A-C. The field coils 604A-C are also not required to be identical to one another, although in some embodiments and use cases this may be preferred. More than one secondary electric current source 612, 712 may also be provided, with each secondary electric current source 612, 712 being connected across a different respective subset of the field coils. Such an arrangement may allow greater control over the magnetic field generated by the superconductor magnet 600, 700, and/or more effective elimination of screening currents, for example. The subsets may be overlapping such that one or more of the field coils belongs to more than one subset and therefore receives DC and/or AC electric current from more than one secondary electric current source. In some cases, a secondary electric current source 612, 712 may be connected across a subset of the field coils, with another secondary electric current source 612, 712 connected across some but not all of the field coils in the subset (i.e. a strict subset of the subset). This type of "nested" arrangement of secondary electric current sources 612, 712 may allow successively greater currents to be provided to the field coils near the centre of the stack, without exceeding the critical current of the HTS material in any of the field coils towards the ends of the stack (where the critical current is lower).

Figure 8:
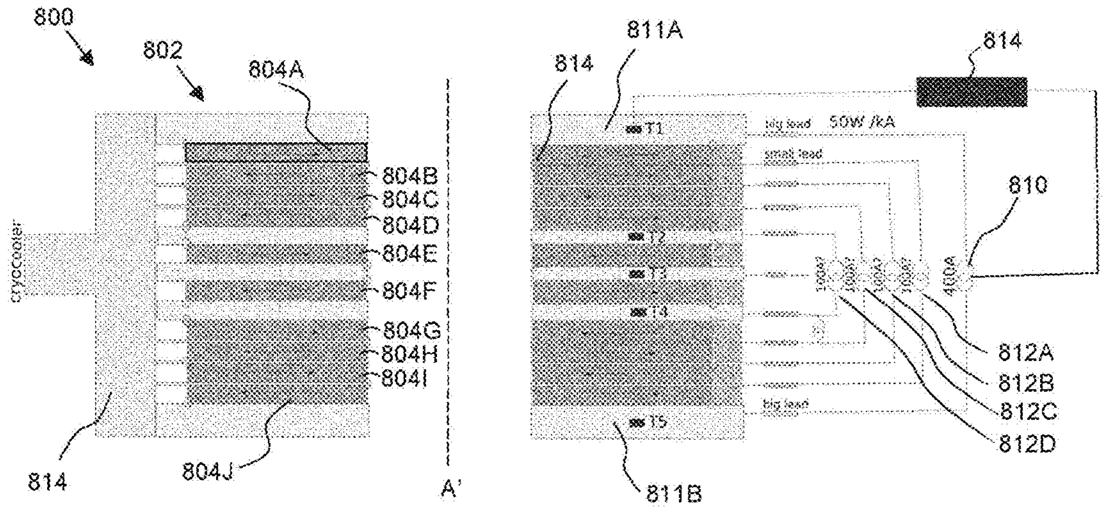
FIG. 8 is a schematic vertical cross section view of a superconductor magnet system.

FIG. 8 shows a superconductor magnet system 800 comprising a superconductor magnet 802 having a central axis A-A' and comprising a stack of 10 pancake coils 804A-J connected in series with one another via joints 814 arranged such that the electric current flows around the turns of each coil in succession, with the direction of the current with respect to the central axis A-A' reversing on passing from one coil to the next. A primary electric current source 810 is connected across the stack of pancake coils 804A-J using a pair of conductive plates 811A-B which act as terminals to allow an electrical connection to be made to the radially outermost end of each of the coils 804A, 804J at either end of the stack. Four secondary electric current sources 812A-D are connected in parallel across different subsets of the coils, with a first of the secondary electric current sources 812A being connected across all but the two field coils 804A, 804J at the end of the stack, a second of the secondary electric current sources 812B being connected across all but the four field coils 804A-B, 804I-J at the ends of the stack and so on. In this example, the electrical connections to these coils 804B-I are made using a series of conductive plates interposed between the coils. The superconductor magnet 802 is cooled by a cryostat 816 that is thermally coupled to the pancake coils 804A-J by the series of plates interposed between the coils and by the plates 811A-B.

The cross sectional area of the leads used to connect the electric current sources 810, 812A-D across the coils 804A-J may differ from one another according to how much electric current each source is required to supply to the field coils. For example, as the primary electric current source 810 supplies the majority of the current (e.g. 400 A in the present example), it may use leads with a greater cross-sectional area compared to the leads used for the secondary electric current sources 812A-D which supply less current (e.g. 100 A). In the example shown in FIG. 8, the primary and secondary electric current sources are located outside of the cryostat and each pair of leads therefore places a thermal load on the cryostat 816. However, as each pair of leads carries only a fraction of the total current needed to power the magnet 802, the amount of resistive heating caused by using two pairs of leads may remain similar to when just a single pair of leads is used to supply the current to the magnet 802. Thus, using multiple electric current sources may allow increased flexibility in the design and operation of the magnet without adversely affecting its cooling and temperature stability.

In the present example, temperature sensors T1-T5 (such as thermocouples) are provided at various positions within the magnet 802 to measure the temperature of the field coils 804A-J. Measurements from one or more of the temperature sensors T1-T5 are provided to a feedback controller 818 (such as a proportional integral derivative (PID) controller), which controls the one or more of the electric current sources 810, 812A-D so as to maintain the temperature of the field coils. For example, as shown in FIG. 8, a temperature sensor T1 provided in the conductive plate 811A may be used to measure the temperature of the first field coil 804A, provide measurements of the temperature to the controller 818, which adjusts the primary electric current source 810 based on the measurements to maintain the temperature of the field coil 804A at a particular setpoint. The field coils 804A-J may also each comprise one or more heaters (not shown), each heater having an associated feedback controller to assist in maintaining the temperatures of the field coils 804A-J. In such implementations, the associated feedback controllers and the controller 818 may be configured such that an increase in radial electric current supplied to a field coil 804A-J is compensated for by decreasing the electric current supplied to the heater of that coil (and vice versa) to maintain the setpoint (i.e. target) temperature.

It will be appreciated by the person of skill in the art that various modifications may be made to the above described embodiments without departing from the scope of the present invention.

The invention claimed is:

1. A high temperature superconductor (HTS) magnet system comprising:

a superconductor magnet comprising a plurality of field coils connected in series, each field coil having a plurality of turns comprising HTS material;

a primary electric current source connected across the plurality of the field coils for supplying a DC electric current to the field coils to generate a magnetic field;

a secondary electric current source connected in parallel with the primary electric current source across a subset of the field coils for supplying an additional DC electric current to the or each field coil in the subset to modify or correct the magnetic field; and a control system for adjusting the additional DC electric current supplied by the secondary electric current source to modify or correct the magnetic field by increasing the homogeneity of the magnetic field in a target region of space.

2. The HTS magnet system according to claim 1, further comprising a magnetic field sensor for measuring one or more parameters of the magnetic field generated by the superconductor magnet.

3. The HTS magnet system according to claim 2, wherein the control system is configured to adjust the additional DC electric current supplied by the secondary electric current source to increase the homogeneity of the magnetic field in the target region of space based on the one or more measured parameters.

4. The HTS magnet system according to claim 1, wherein the system is configured such that the HTS material in the or each field coil in the subset has a higher critical current than the HTS material in the field coils not in the subset when the DC electric current from the primary electric current source is supplied to the field coils.

5. The HTS magnet system according to claim 1, wherein the primary and secondary electric current sources are configured such that the additional DC electric current supplied by the secondary electric current source is less than the DC electric current supplied by the primary electric current source.

6. The HTS magnet system according to claim 1, wherein the field coils comprise a stack of planar coils and the subset of field coils comprise one or more individual adjacent field coils in the stack.

7. The HTS magnet system according to claim 6, wherein the subset of the field coils excludes one or both of the field coils at either end of the stack.

8. The HTS magnet system according to claim 1, wherein the turns in each of the field coils are connected by an electrically conductive material such that electric current can be shared between the turns in the field coil; and/or wherein each field coil has an alternative current path across it, the alternative current path comprising electrically conductive material and having a low inductance compared to the respective coil such that a changing current across the field coil preferentially flows through the alternative current path.

9. The HTS magnet system according to claim 8, wherein the secondary electric current source is configurable to cause an additional AC electric current to flow via the electrically conductive material of the or each field coil in the subset, whereby resistive heating of the electrically conductive material heats the HTS material of the or each field coil in the subset.

10. The HTS magnet system according to claim 1, further comprising a cryostat housing the magnet, the cryostat being configured to maintain the HITS material at temperatures below a critical temperature of the HTS material during operation of the magnet, the primary electric current source and the secondary electric current source being housed within the cryostat, the cryostat comprising feedthroughs for supplying electrical power to the primary electric current source and the secondary electric current source, the primary electric current source and the secondary electric current source being configured to receive electrical power from different feedthroughs.

11. The HTS magnet system according to claim 1, further comprising a further secondary electric current source connected across a further subset of the field coils for supplying an additional DC and/or AC electric current to the field coils in the further subset.

12. The HTS magnet system according to claim 11, wherein the secondary electric current source and the further secondary electric current source are connected in parallel across the further subset of the field coils.

13. A nuclear magnetic resonance (NMR) device comprising an HTS magnet system according to claim 1.

14. A method of generating a magnetic field using a high temperature superconductor (HTS) magnet comprising a plurality of field coils connected in series, each field coil having a plurality of turns comprising HTS material, the method comprising:

using a primary electric current source connected across the plurality of the field coils to supply a DC electric current to the field coils to generate a magnetic field; and using a secondary electric current source connected in parallel with the primary electric current source across a subset of the field coils to supply an additional DC electric current to the or each field coil in the subset to modify or correct the magnetic field, wherein modifying or correcting the magnetic field comprises increasing the homogeneity of the magnetic field in a target region of space.

15. The method according to claim 14, further comprising obtaining measurements of one or more parameters of the magnetic field generated by the superconductor magnet, and modifying or correcting the magnetic field based on the measurements.

16. The method according to claim 14, wherein the additional DC electric current supplied by the secondary electric current source is less than the DC electric current supplied by the primary electric current source.

17. The method according to claim 16, wherein the additional DC electric current supplied by the secondary electric current source is adjusted such that a maximum transport current to critical current ratio of the HTS material in each of the field coils differs by less than 20%.

18. The method according to claim 14, wherein the turns in each of the field coils are connected by an electrically conductive material such that electric current can be shared between the turns in the field coil and/or each field coil has an alternative current path across it, the alternative current path comprising electrically conductive material and having a low inductance compared to the respective coil such that a changing current across the field coil preferentially flows through the alternative current path, the method further comprising using the secondary electric current source to supply an additional AC electric current that flows in the electrically conductive material of the or each field coil in the subset, whereby resistive heating of the electrically conductive material heats the HTS material in the or each field coil in the subset.

19. The method according to claim 14, wherein the or each field coil in the subset has a time constant defined by a ratio of the inductance of the field coil to a radial resistance of the field coil and the additional DC electric current is maintained over multiple time constants.

* * * * *